US007399338B2

(12) United States Patent
Matsuura

(10) Patent No.: US 7,399,338 B2
(45) Date of Patent: Jul. 15, 2008

(54) METHOD AND APPARATUS FOR CONCENTRATING A SOLUTION

(75) Inventor: Kazuo Matsuura, Naruto (JP)

(73) Assignee: Ultrasound Brewery, Tokushima (JP)

( * ) Notice: Subject to any disclaimer, the term of this patent is extended or adjusted under 35 U.S.C. 154(b) by 530 days.

(21) Appl. No.: 11/087,768

(22) Filed: Mar. 24, 2005

(65) Prior Publication Data

US 2005/0223890 A1 Oct. 13, 2005

(30) Foreign Application Priority Data

Mar. 25, 2004 (JP) ............................ 2004-090694

(51) Int. Cl.
*B01D 19/00* (2006.01)

(52) U.S. Cl. ............................... 95/30; 96/175; 96/219; 96/220; 96/389

(58) Field of Classification Search ..................... 95/29, 95/30; 96/175, 219, 220, 389
See application file for complete search history.

(56) References Cited

U.S. PATENT DOCUMENTS 4,643,832 A 2/1987 Iniotakis et al.
6,235,088 B1 5/2001 Matsuura

FOREIGN PATENT DOCUMENTS

| | | | |
|---|---|---|---|
| FR | 2 857 881 | 1/2005 | |
| GB | 2 404 880 | 2/2005 | |
| JP | 54-134853 | 10/1979 | |
| JP | 54134853 A | * 10/1979 | .................... 62/85 |
| JP | 3-229601 | 10/1991 | |
| JP | 7-185203 | 7/1995 | |
| JP | 9-117603 | 5/1997 | |
| JP | 10-71320 | 3/1998 | |
| JP | 10-295358 | 11/1998 | |
| JP | 2001-314724 | 11/2001 | |
| JP | 2003-311102 | 11/2003 | |

* cited by examiner

*Primary Examiner*—Robert A Hopkins
(74) *Attorney, Agent, or Firm*—Wenderoth, Lind & Ponack, LLP

(57) ABSTRACT

In the present invention, a solution containing a target substance is atomized into a mist by ultrasonic oscillation in an ultrasonic atomization chamber, and the target substance is collected by aggregating the atomized mist in a collection chamber, whereby the target substance is separated from the solution. Further, in the present invention, the gas phase pressure in the collection chamber is maintained to be higher than an atmospheric pressure, whereby the saturation vapor pressure of the target substance in the gas phase is made lower than the saturation vapor pressure under atmospheric pressure.

5 Claims, 14 Drawing Sheets

METHOD AND APPARATUS FOR CONCENTRATING A SOLUTION

BACKGROUND OF THE INVENTION

1. Field of the Invention

The present invention relates to a method and an apparatus for concentrating a solution that separate and concentrate a higher concentration of alcohol mainly from an alcohol solution such as sake (Japanese rice wine) or sake raw materials.

2. Description of the Related Art

The inventor of the present invention has developed an apparatus for separating alcohol which is a target material exhibiting a physical property of surface excess (See Japanese Laid-open Patent Publication TOKUKAI No. 2001-314724).

With this type of separating apparatus, an ultrasonic atomization chamber with a closed structure is filled with an alcohol solution, and the alcohol solution in the ultrasonic atomization chamber is atomized into a mist by means of ultrasonic oscillation with an ultrasonic oscillator. The alcohol separating apparatus aggregates and collects the atomized mist, and separates a higher concentration of alcohol solution. More specially, the alcohol separating apparatus separates a higher concentration of alcohol solution as a target material as follows.

With an alcohol, which quickly moves to the surface and exhibits a physical property of surface excess, the concentration of alcohol is high at its surface. When the solution is oscillated in this state by ultrasonic oscillation, fine liquid droplets of are ejected into air as a mist from the surface of the solution by ultrasonic oscillation energy. The mist ejected into air has a higher concentration of alcohol. The reason is that the solution at its surface with a higher concentration of alcohol is ejected as the mist. Therefore, a solution with a higher concentration of alcohol can be separated by aggregating and collecting the mist. With this method, a high concentration of alcohol solution can be separated without heating the solution. Thus, a target material can be separated at a high concentration with a less energy consumption. Furthermore, since heating is not necessary, the separating apparatus has an advantage in that the target material can be separated without deterioration of the quality.

It is important in this apparatus that the mist obtained by ultrasonic oscillation is collected with a good efficiency. The mist volatilized into air by ultrasonic oscillation has a higher concentration of the target material than the solution. Part of the mist made of fine liquid droplets is vaporized into gas. When the target material that has become gas is not collected, the collection efficiency will be poor. For this reason, the target material that has become gas is cooled and collected. The reason is as follows. When the gas is cooled, the saturation vapor pressure decreases. Therefore, the target material that has become gas can be liquefied in a supersaturated state. The lower the cooling temperature is, the lower the saturation vapor pressure of the target material will be. For this reason, the amount by which the target material becomes supersaturated increases to enhance the collection efficiency. However, the saturation vapor pressure does not decrease in proportion to the temperature. The lower the temperature is, the lower the ratio of decrease in the saturation vapor pressure will be, even if the temperature is lowered. For this reason, it is difficult in the method of lowering the temperature to collect all of the target material with a high efficiency.

The present invention has been developed in order to collect a target material with a higher efficiency, and an important object of the present invention is to provide a method and an apparatus for concentrating a solution that collect a target material with a high efficiency by increasing the pressure in the collection chamber.

SUMMARY OF THE INVENTION

A method of concentrating a solution according to the present invention includes the steps of atomizing a solution containing a target substance into a mist by ultrasonic oscillation in an ultrasonic atomization chamber and collecting the target substance by aggregating the atomized mist in a collection chamber so as to separate the target substance from the solution. Further, in the method of concentrating a solution according to the present invention, a gas phase pressure in the collection chamber is maintained to be higher than an atmospheric pressure, whereby a saturation vapor pressure of the target substance in a gas phase is made lower than a saturation vapor pressure thereof under atmospheric pressure In the method of concentrating a solution according to the present invention, a gas containing the mist generated in the ultrasonic atomization chamber can be transported to the collection chamber by a compressor so as to increase the pressure in the collection chamber to be higher than the atmospheric pressure. In the method of concentrating a solution according to the present invention, the mist can be aggregated and collected by cooling an inside of the collection chamber.

In the method of concentrating a solution according to the present invention, the mist in the collection chamber can be mechanically collected by means of any one of a cyclone, a punched plate, a demistor, a chevron, a scrubber, and a spray tower, or alternatively the mist can be electrically collected by aggregating the mist with static electricity. In addition, in the method of concentrating a solution according to the present invention, the mist in the collection chamber can be collected by cooling the inside of the collection chamber while mechanically or electrically collecting the mist.

In the method of concentrating a solution according to the present invention, the pressure in the collection chamber can be increased to be higher than an atmospheric pressure while restricting discharge of the mist by inhibiting or restricting passage of the mist and increasing a passage resistance of gas on an outlet side of the collection chamber.

An apparatus for concentrating a solution according to the present invention includes an ultrasonic atomization chamber to which a solution containing a target substance is supplied; an ultrasonic oscillator for atomizing the solution into a mist by ultrasonic oscillation in an inside of the ultrasonic atomization chamber; an ultrasonic power supply connected to the ultrasonic oscillator for supplying high-frequency electric power to the ultrasonic oscillator to generate ultrasonic oscillation; and a collection chamber for aggregating and collecting the mist atomized by the ultrasonic oscillator, whereby the mist atomized in the ultrasonic atomization chamber is collected in the collection chamber to separate the target substance from the solution. The apparatus further includes a compressor connected between an outlet side of the ultrasonic atomization chamber and an inlet side of the collection chamber to absorb and supply the mist in the ultrasonic atomization chamber to the collection chamber. In this concentration apparatus, the compressor increases a pressure in the collection chamber to be higher than an atmospheric pressure, whereby a saturation vapor pressure of the target substance in a gas phase in the collection chamber is made lower than a saturation vapor pressure thereof under atmospheric pressure, so as to aggregate and collect the mist.

The above has an advantage in that the target substance can be collected with a higher efficiency. The reason is that in the present invention, a solution containing a target substance is atomized into a mist by subjecting the solution to ultrasonic oscillation in an ultrasonic atomization chamber, and the gas phase pressure in the collection chamber that collects the atomized mist is increased to be higher than an atmospheric pressure to separate and collect the target substance from the solution. When the gas phase pressure in the collection chamber is increased to be higher than an atmospheric pressure, the saturation vapor pressure of the target substance in gas phase in the collection chamber is made lower than the saturation vapor pressure thereof under atmospheric pressure. Therefore, in the present invention, the target substance can be aggregated and collected with a good efficiency in the collection chamber in which the pressure is increased to be higher than an atmospheric pressure to lower the saturation vapor pressure of the target substance.

In the apparatus for concentrating a solution according to the present invention, the collection chamber can be provided with a cooling heat exchanger, wherein the cooling heat exchanger 33 can cool, aggregate, and collect the mist.

In the apparatus for concentrating a solution according to the present invention, the mist can be collected by connecting any one of a cyclone, a punched plate, a demistor, a chevron, a scrubber, a spray tower, and an electrostatic collector to the ultrasonic atomization chamber.

In the apparatus for concentrating a solution according to the present invention, a throttle valve can be connected to an outlet side of the collection chamber, and a heat-discharging heat exchanger can be provided for exchanging heat between a portion on an outlet side of the throttle valve and a portion on an outlet side of the compressor which is also an inlet side of the collection chamber.

In the apparatus for concentrating a solution according to the present invention, a heat-radiating heat exchanger for cooling and liquefying a refrigerant can be connected to a refrigerant circulation path of the cooling heat exchanger, and the heat-radiating heat exchanger can be thermally coupled to the heat-discharging heat exchanger connected to an outlet side of the throttle valve, whereby the heat-radiating heat exchanger can be cooled by the heat-discharging heat exchanger.

The above and further objects and features of the invention will more fully be apparent from the following detailed description with accompanying drawings.

DETAILED DESCRIPTION OF THE PREFERRED EMBODIMENTS

Figure 1:
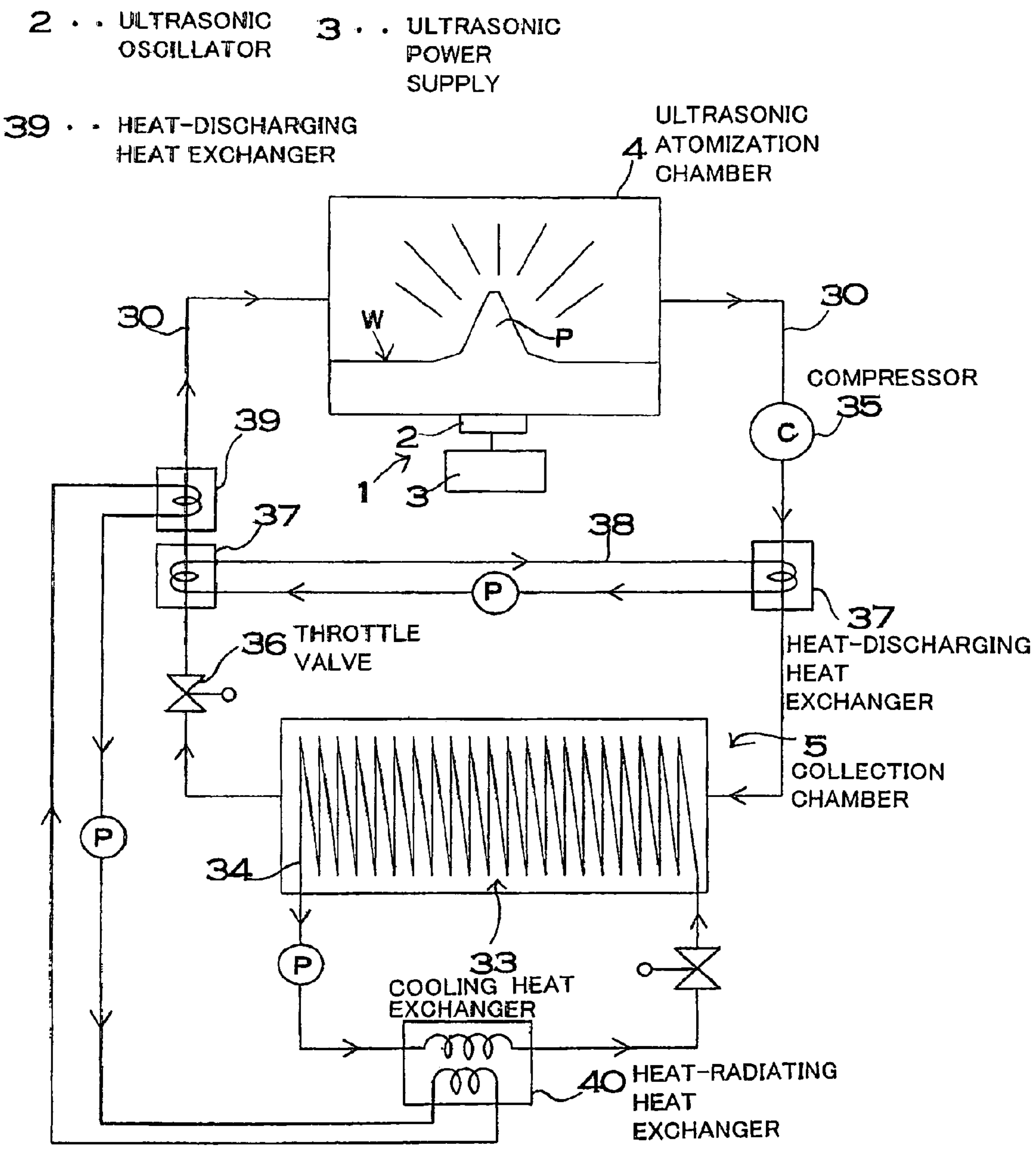
FIG. 1 is a diagram schematically showing an apparatus for concentrating a solution according to one embodiment of the present invention.

An apparatus for concentrating a solution according to the present invention separates a target material, which quickly moves to liquid surface and exhibits a physical property of surface excess, from a solution containing the target material. In the present invention, solutes and solvents of the solution are not specifically limited in the present invention, however, water is mainly used as a solvent. For example, organic solvents such as an alcohol can be used other than water. Following solutions including target materials can be used, for example.

(1) Refined sake, beer, wine, vinegar, mirin (sweet sake for cooking), spirits, shochu (Japanese spirits), brandy, whisky and liqueur.

(2) Solutions containing a perfume, an aromatic component or a fragrant component such as pinene, linalool, limonene, or polyphenols.

(3) Solutions containing an organic compound that is classified as any one of alkane and cycloalkane, which are a saturated hydrocarbon, alkene, cycloalkene, and alkyne, which are an unsaturated hydrocarbon, ether, thioether, and aromatic hydrocarbon, or a compound obtained by bonding these.

(4) Solutions containing a substance obtained by substituting a halogen(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

(5) Solutions containing a substance obtained by substituting a hydroxy group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

(6) Solutions containing a substance obtained by substituting an amino group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

(7) Solutions containing a substance obtained by substituting a carbonyl group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

(8) Solutions containing a substance obtained by substituting a carboxyl group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

(9) Solutions containing a substance obtained by substituting a nitro group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

(10) Solutions containing a substance obtained by substituting a cyano group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

(11) Solutions containing a substance obtained by substituting a mercapto group(s) for at least one hydrogen atom or functional group of an organic compound that is classified as any one of alkane and cycloalkane, which are a saturated hydrocarbon, alkene, cycloalkene and alkyne, which are an unsaturated hydrocarbon, ether, thioether, and aromatic hydrocarbon, or a bonded compound of these.

(12) Solutions containing a substance obtained by substituting a metal ion(s) for at least one atom of the target substances mentioned in (3) to (11).

(13) Solutions containing a substance obtained by substituting an arbitrary molecule(s) of the molecules mentioned in (3) to (11) for an arbitrary hydrogen atom(s), carbon atom (s), or functional group(s) contained in the target substances mentioned in (3) to (11).

The target materials contained in the above solutions quickly move to the surface and exhibit a physical property of surface excess. The concentrations of these target material are high at the surface. Accordingly, when the solutions at the surface are atomized into a mist by subjecting them to ultrasonic oscillation, the mist has a higher concentration of the target materials. Therefore, aggregating and collecting the mist can make the concentration of the target materials higher. That is, a compound containing a higher concentration of the target material can be separated from the solution.

The following description will describe an apparatus and a method for separating alcohol at a high concentration from a solution containing the alcohol as a target material. However, in the present invention, the target material is not limited to an alcohol. Any target material, which quickly moves to the surface and exhibits a physical property of surface excess, can be separated.

Figure 2:
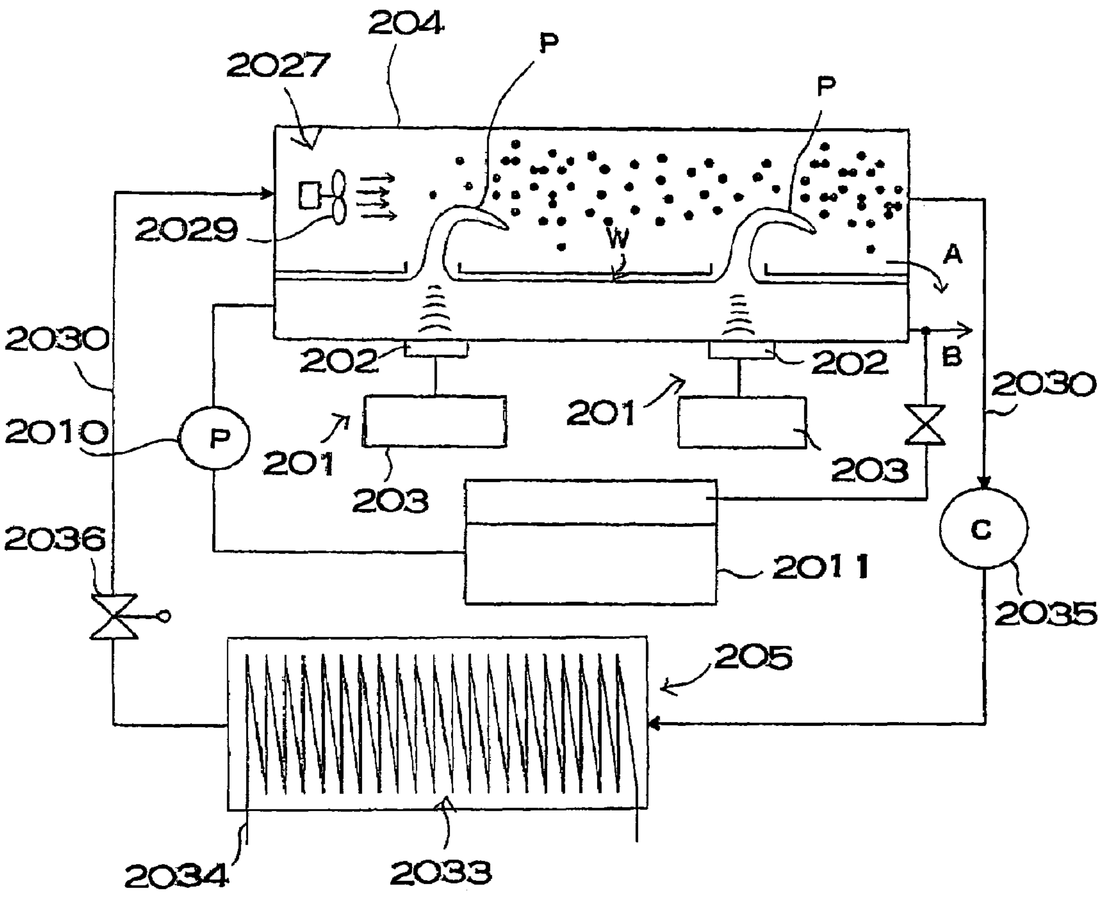
FIG. 2 is a diagram schematically showing an apparatus for concentrating a solution according to another embodiment of the present invention.
Figure 3:
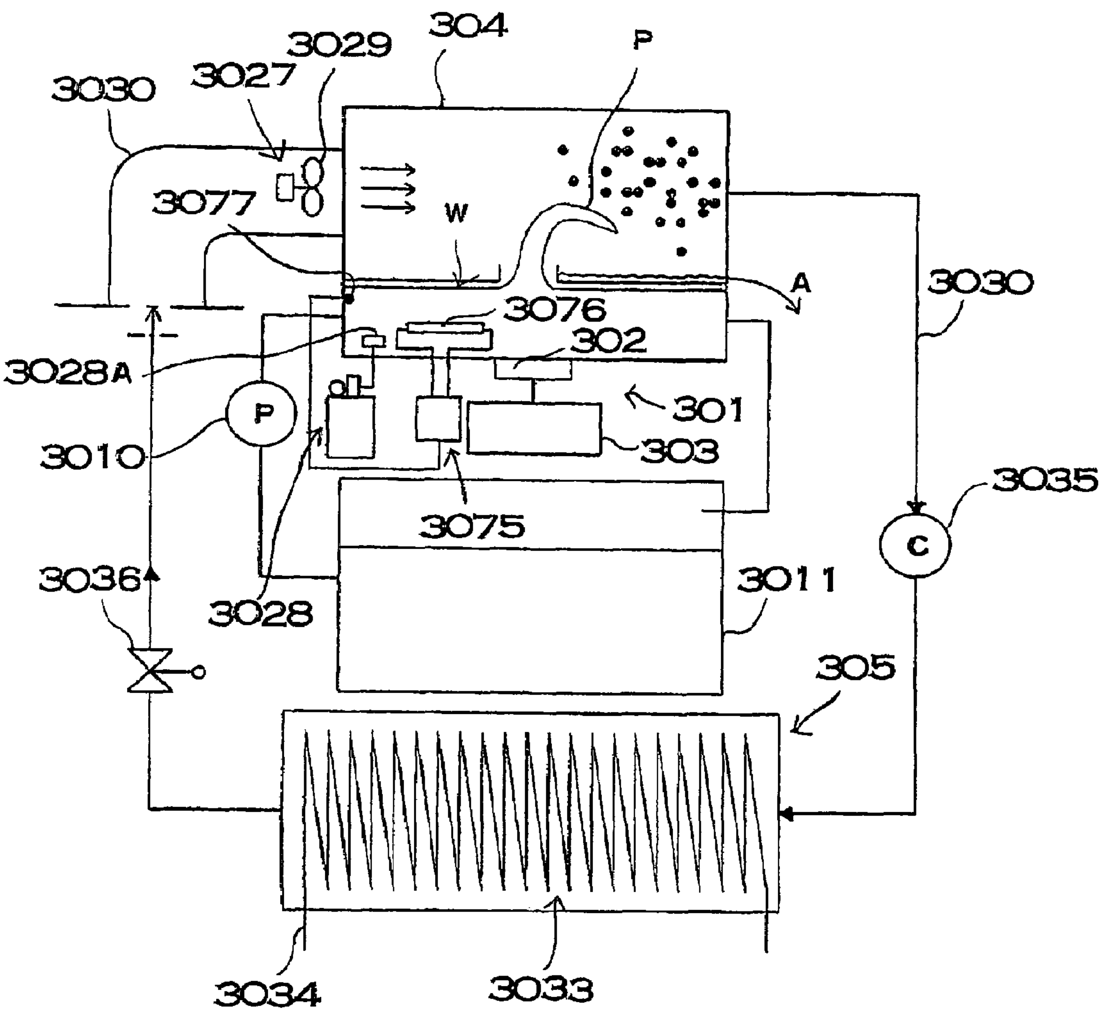
FIG. 3 is a diagram schematically showing an apparatus for concentrating a solution according to another embodiment of the present invention.

A concentration apparatus shown in FIGS. 1 to 3 includes: an ultrasonic atomizer 1, 201, 301 comprising an ultrasonic atomization chamber 4, 204, 304 having a closed structure to which a solution is supplied, a plurality of ultrasonic oscillators 2, 202, 302 for atomizing the solution in the ultrasonic atomization chamber 4, 204, 304 into a mist by subjecting the solution to ultrasonic oscillation, and an ultrasonic power supply 3, 203, 303; a collection chamber 5, 205, 305 for aggregating and collecting the mist atomized in the ultrasonic atomization chamber 4, 204, 304; and a compressor 35, 2035, 3035 for supplying the mist atomized in the ultrasonic atomization chamber 4, 204, 304 to the collection chamber 5, 205, 305 together with a carrier gas in a state of being pressurized to have a pressure higher than an atmospheric pressure. The carrier gas is air. However, as a carrier gas, an inert gas such as nitrogen gas or carbon dioxide gas can be also used.

The solution is supplied to the ultrasonic atomization chamber 4, 204, 304 by a pump 2010, 3010. The ultrasonic atomization chamber 4, 204, 304 does not atomize all the solution supplied thereto as a mist. The reason is that, if all the solution is atomized and collected in the collection chamber 5, 205, 305, the concentration of a target material such as alcohol in the solution collected in the collection chamber 5, 205, 305 will be the same as that of the solution supplied to the ultrasonic atomization chamber 4, 204, 304. With the solution supplied to the ultrasonic atomization chamber 4, 204, 304, the concentration of the target material decreases as the amount of the solution decreases due to the atomization into a mist. Therefore, the concentration of the target material contained in the mist also gradually decreases. The solution in the ultrasonic atomization chamber 4, 204, 304 is replaced with a new solution when the concentration of the target material decreases.

A solution containing the target material, for example, at a concentration of 10 to 50% by weight is atomized in the ultrasonic atomization chamber 4, 204, 304. When the concentration of the target material decreases, the solution in the ultrasonic atomization chamber 4, 204, 304 is replaced with a new solution. The solution is replaced in a batch manner, i.e. by a method in which the solution is replaced with a new one each time after a predetermined period of time passes. However, a stock solution tank 2011, 3011 storing a solution may be connected to the ultrasonic atomization chamber 204, 304 via a pump 2010, 3010, whereby the solution can be also supplied continuously from the stock solution tank 2011, 3011. With this apparatus, the ultrasonic atomization chamber 4, 204, 304 is supplied with a solution from the stock solution tank 2011, 3011 while discharging the solution in the ultrasonic atomization chamber 4, 204, 304, thus preventing decrease in the concentration of the target material such as alcohol in the solution in the ultrasonic atomization chamber 4, 204, 304. Also, as shown by an arrow B in FIG. 2, the solution in the ultrasonic atomization chamber 204 can be discharged to the outside without being circulated into the stock solution tank 2011, so as to prevent decrease in the concentration of the target material contained in the stock solution tank 2011.

The solution in the ultrasonic atomization chamber 4, 204, 304 is atomized into a mist by the ultrasonic atomizer 1, 201, 301. The mist atomized by the ultrasonic atomizer 1, 201, 301 has a higher concentration of the target material than the solution. Therefore, the ultrasonic atomizer 1, 201, 301 produces a mist from the solution, and the mist is aggregated and collected, whereby a highly concentrated solution can be efficiently separated.

Figure 4:
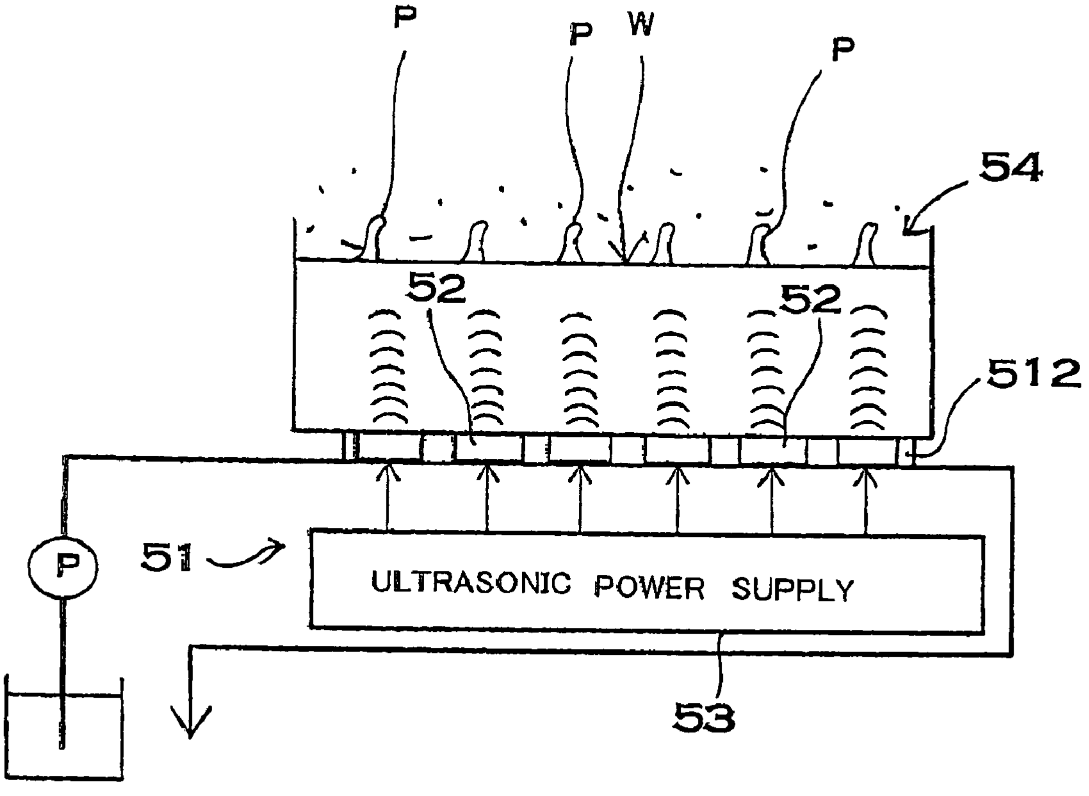
FIG. 4 is a cross-sectional view schematically showing one example of an ultrasonic atomization chamber and an ultrasonic atomizer.

The solution in the ultrasonic atomization chamber 4, 204, 304 is volatilized from the solution surface W as a mist with a concentration higher than the solution in the ultrasonic atomization chamber 4, 204, 304 by being subjected to ultrasonic oscillation. When the solution is subjected to ultrasonic oscillation, liquid columns P appear on the solution surface W. The mist is produced from the surface of the liquid columns P. With the ultrasonic atomizer 51 shown in FIG. 4, ultrasonic oscillators 52 of the ultrasonic atomizer 51 are arranged to face upwards on the bottom of the ultrasonic atomization chamber 54 filled with the solution. The ultrasonic oscillators 52 emit ultrasonic waves upward from the bottom toward the solution surface W, and subjects the solution surface W to ultrasonic oscillation to produce liquid columns P The ultrasonic oscillators 52 emit ultrasonic waves in the vertical direction.

The ultrasonic atomizer 51 shown in the drawings includes a plurality of ultrasonic oscillators 52 and an ultrasonic power supply 53 that oscillates these ultrasonic oscillators 52 at an ultrasonic frequency. The ultrasonic oscillators 52 are fixed, in a watertight structure, to the bottom of the ultrasonic atomization chamber 54. The apparatus, which oscillates the solution at an ultrasonic frequency by means of the plurality of ultrasonic oscillators 52, produces a mist from the solution more efficiently.

Figure 5:
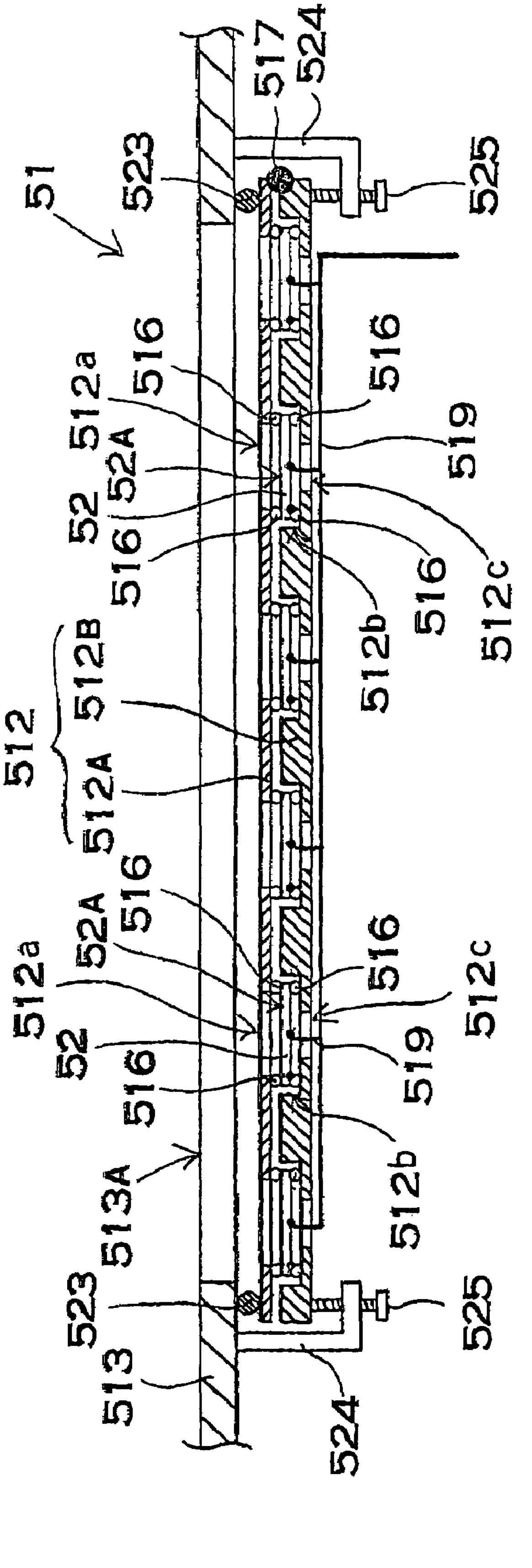
FIG. 5 is an enlarged cross-sectional view showing one example of a connection structure between an ultrasonic oscillator and a detachable plate.
Figure 6:
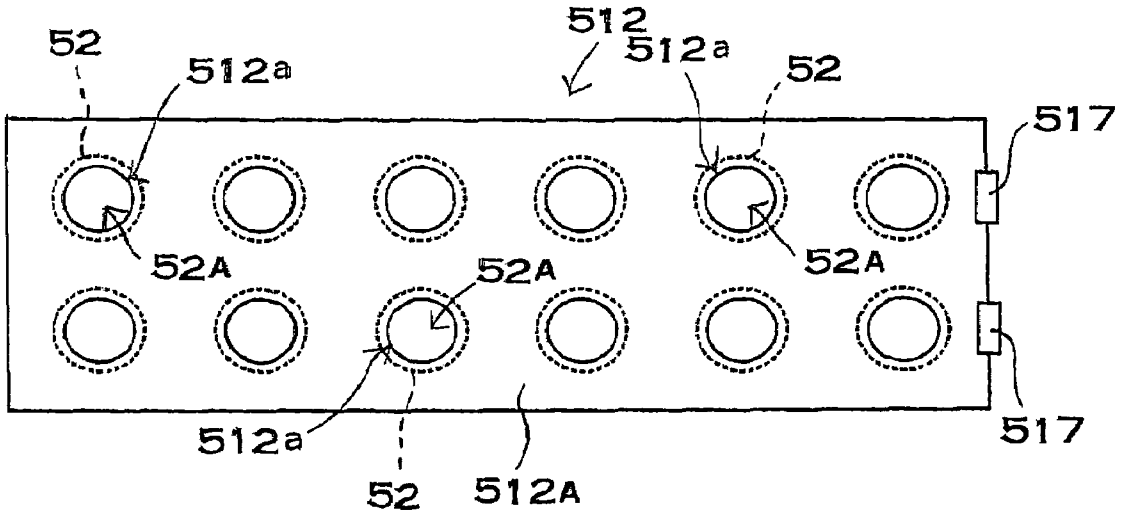
FIG. 6 is a plan view of the detachable plate shown in FIG. 5.
Figure 7:
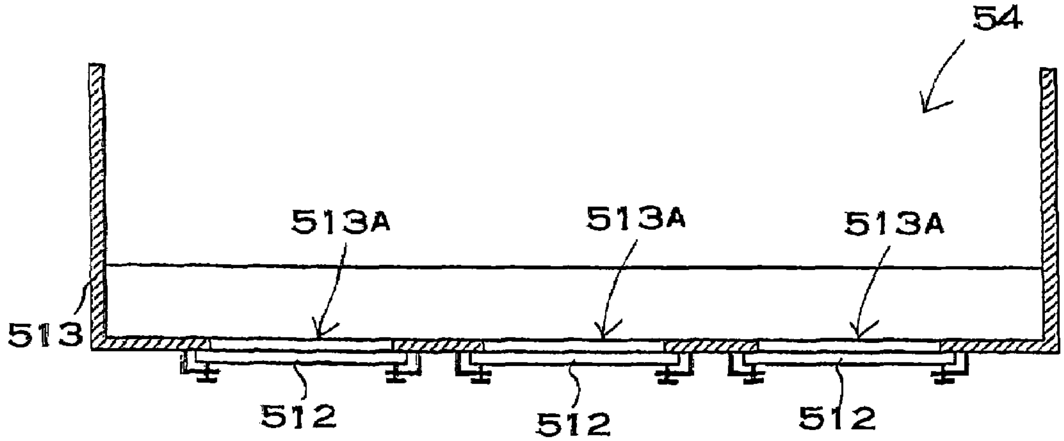
FIG. 7 is a cross-sectional view showing a state in which the detachable plate is attached to the ultrasonic atomization chamber.
Figure 8:
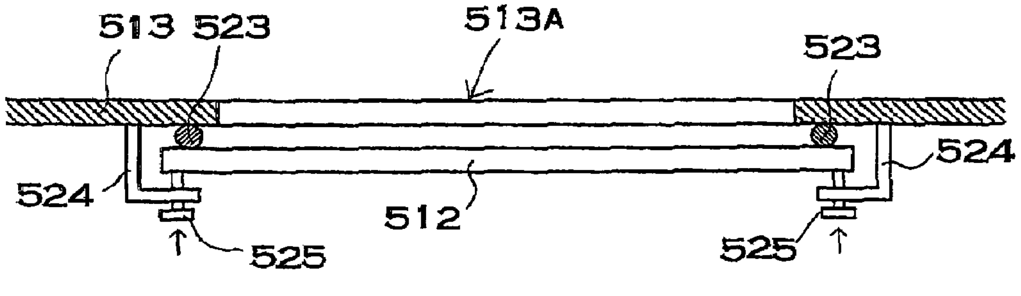
FIG. 8 is an enlarged cross-sectional view showing a connection structure between the detachable plate and the ultrasonic atomization chamber shown in FIG. 7.

The plurality of ultrasonic oscillators 52 are fixed to a detachable plate 512 in a watertight structure, as shown in FIGS. 5 and 6. The detachable plate 512, on which the plurality of ultrasonic oscillators 52 are fixed, is attached to a casing 513 of the ultrasonic atomization chamber 54 to be detachable in a watertight structure, as shown in FIGS. 7 and 8. The detachable plate 512 is attached to the casing 513 of the ultrasonic atomization chamber 54, thus, each ultrasonic oscillator 52 oscillates the solution in the ultrasonic atomization chamber 54 at an ultrasonic frequency.

The detachable plate 512 shown in FIGS. 5 and 6 includes a front side plate 512A and a backside plate 512B. The front side plate 512A and the backside plate 512B are laminated to sandwich the ultrasonic oscillators 52 between the front side plate 512A and the backside plate 512B in a watertight structure. The front side plate 512A is provided with through holes 512*a* opening thereon. The front side plate 512A and the backside plate 512B sandwich and fix the ultrasonic oscillators 52 so that oscillation surfaces 52A are positioned in the through holes 512*a*. The backside plate 512B is provided with recessed portions 512*b* in which the ultrasonic oscillators 52 are fitted. With the detachable plate 512 of FIG. 5, the recessed portions 512*b* are provided in the backside plate 512B; however, the recessed portions may be provided in the front side plate to fit the ultrasonic oscillators in the recessed portions. Here, in FIG. 5, the reference numeral 512*c* represents through holes, and the reference numeral 519 represents a lead wire.

In order to provide a watertight structure between the ultrasonic oscillators 52 and the front side plate 512A, a packing member 516 is sandwiched between the ultrasonic oscillators 52 and the front side plate 512A. With the ultrasonic atomizer 51 shown in FIG. 5, another packing member 516 is also sandwiched between the ultrasonic oscillators 52 and the backside plate 512B in order to provide a watertight structure. However, with the ultrasonic atomizer, the watertight structure need not always be provided between the ultrasonic oscillators and the backside plate. The reason is that, when a detachable plate provides a watertight structure between the ultrasonic oscillators and the front side plate, fixing the detachable plate on the lower surface of the casing of the ultrasonic atomization chamber can prevent leakage of the solution in the ultrasonic atomization chamber. The packing member 516 is an O-ring made of elastic rubber. The packing member 516 of the O-ring is disposed on the outer periphery of the oscillation surface 52A of the ultrasonic oscillators 52 and a surface of the front side plate 512A opposed thereto. The packing member 516 provides a watertight structure between the oscillation surface 52A of the ultrasonic oscillators 52 and the front side plate 512A, thereby preventing leakage of water from there. Additionally, the outer periphery of the ultrasonic oscillators 52 and the backside plate 512B are connected in a watertight structure.

The packing member 516 is an elastic rubber made of Teflon (registered trademark), silicone, natural or synthetic rubber, or the like. The packing members 516 are sandwiched between the ultrasonic oscillators 52 and the front side plate 512A and between the ultrasonic oscillators 52 and the backside plate 512B so as to be elastically deformed and crushed. Thus, the packing members 516 come into close contact with the surfaces of the ultrasonic oscillators 52, the front side plate 512A, and the backside plate 512B without a gap so as to provide a watertight structure in the connection portions. Here, the packing member 516 may be a ring-shaped metal packing member made of a metal such as copper, brass, aluminum, or stainless steel.

With the detachable plate 512 shown in FIGS. 5 and 6, the front side plate 512A and the backside plate 512B are connected to each other by a hinge 517 at one end of each plate. The front side plate 512A and the backside plate 512B of the detachable plate 512 can be opened to attach and detach the ultrasonic oscillators 52 easily. When the ultrasonic oscillators 52 are to be replaced, the front side plate 512A and the backside plate 512B are opened. In this state, the old ultrasonic oscillators are removed, and then new ultrasonic oscillators 52 and packing members 516 are put into predetermined positions. Subsequently, the front side plate 512A and the backside plate 512B are closed, thus, replacement of ultrasonic oscillators 52 is achieved. In addition, the closed backside plate 512B and front side plate 512A are connected at an end of each plate opposite to the hinge 517 with a fastening screw (not shown), or alternatively connected by being fastened to the casing 513 of the ultrasonic atomization chamber 54.

Figure 9:
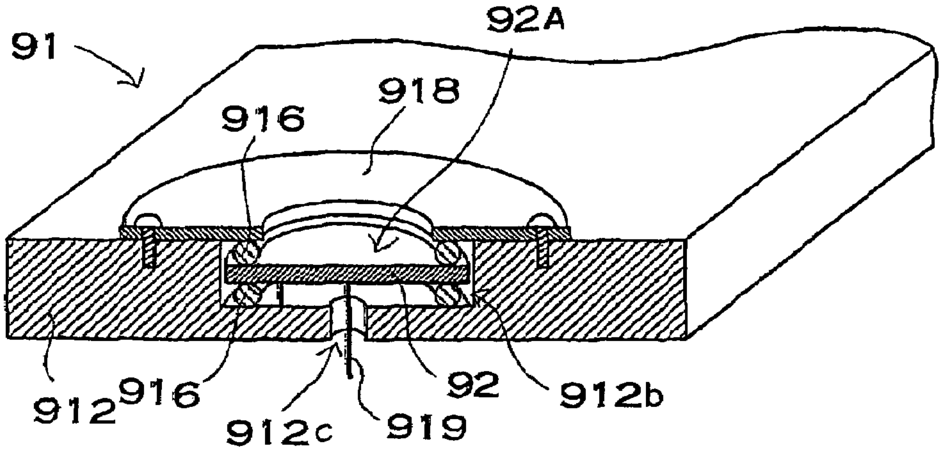
FIG. 9 is an enlarged cross-sectional perspective view showing another example of a connection structure between the ultrasonic oscillator and the detachable plate.
Figure 10:
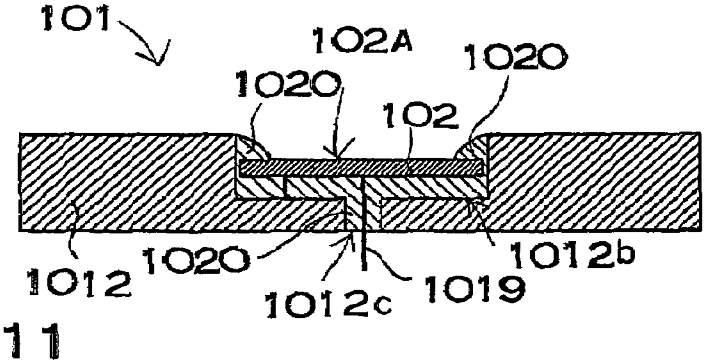
FIG. 10 is an enlarged cross-sectional view showing another example of a connection structure between the ultrasonic oscillator and the detachable plate.
Figure 11:
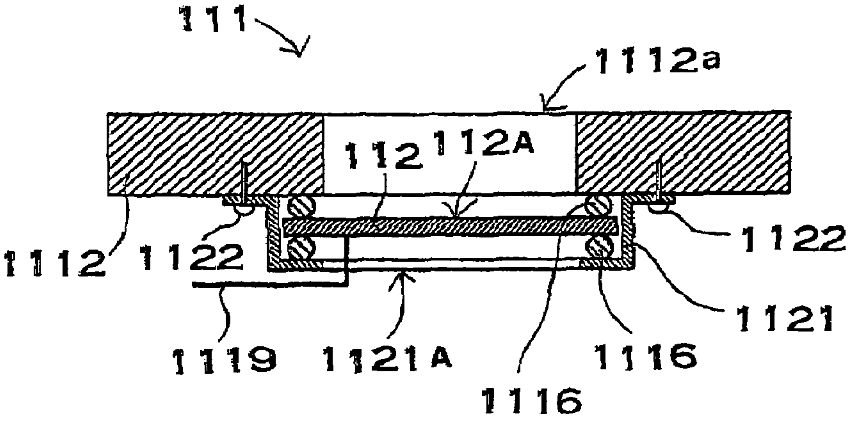
FIG. 11 is an enlarged cross-sectional view showing another example of a connection structure between the ultrasonic oscillator and the detachable plate.

The above ultrasonic atomizer 51 provides a watertight structure by means of the packing member 516; however, the ultrasonic atomizer may provide a watertight structure by filling the positions corresponding to the packing member with a caulking material. Furthermore, with the ultrasonic atomizer 51 shown in FIG. 5, the detachable plate 512 is composed of two metal plates or hard non-metal plates of the front side plate 512A and the backside plate 512B; however, the detachable plate may be composed of one plate as shown in FIGS. 9 to 11. The detachable plates 912, 1012, and 1112 are metal plates or hard non-metal plates. The detachable plates 912, 1012, and 1112 are provided with recessed portions 912*b* and 1012*b* thereon for disposing ultrasonic oscillators 92, 102, or provided with opened through holes 1112*a*.

With the ultrasonic atomizer 91 of FIG. 9, the ultrasonic oscillator 92 is disposed in the recessed portion 912*b* of the detachable plate 912, and packing members 916 are arranged on the upper and lower peripheries of the ultrasonic oscillator 92. Furthermore, a ring plate 918 is fixed to an opening of the detachable plate 912. The ring plate 918 presses the packing member 916 disposed on the upper surface of the ultrasonic oscillator 92, thus the ultrasonic oscillator 92 is fixed in the recessed portion 912*b* in a watertight structure. The recessed portion 912*b* is provided with a through hole 912*c* on its bottom. A lead wire 919 extends outward through the through hole 912*c*. Here, in FIG. 9, the reference numeral 912A represents an oscillation surface.

With the ultrasonic atomizer 101 of FIG. 10, the ultrasonic oscillator 102 put into the recessed portion 1012*b* of the detachable plate 1012 is bonded with a caulking material 1020 and fixed in a watertight structure without using the packing member and the ring plate. With this ultrasonic oscillator 102, a lead wire 1019 extends outward through a penetrating through hole 1012*c* that is opened at the bottom of the recessed portion 1012*b*. The through hole 1012*c*, through which the lead wire 1019 passes, is filled with the caulking material 1020, thus providing a watertight structure. Here, in FIG. 10, the reference numeral 1012A represents an oscillation surface.

With the ultrasonic atomizer 111 of FIG. 11, the detachable plate 1112 is provided with a penetrating through hole 1112*a*. The ultrasonic oscillator 112 is fixed to the lower surface of the detachable plate 1112 so that an oscillation surface 112A is positioned under the through hole 1112*a*. In order to fix the detachable plate 1112 to the ultrasonic oscillator 112, a fixing member 1121 is fixed to the bottom surface of the detachable plate 1112. The ultrasonic oscillator 112 is fixed, in a watertight structure, to the detachable plate 1112 via packing members 1116 arranged on the upper and lower peripheries of the ultrasonic oscillator 112. The fixing member 1121 is a stepped annular member, which has a recessed portion and an outer flange portion, and is fixed to the detachable plate 1112 by screwing fixing screws 1122, which penetrate through the outer flange portion, in the detachable plate 1112. The fixing member 1121 presses the packing member 1116 disposed on the lower surface of the ultrasonic oscillator 112 by the bottom of the recessed portion, thus the ultrasonic oscillator 112 is fixed to the detachable plate 1112 in a watertight structure. The fixing member 1121 is provided with a through hole 1121A on the bottom of the recessed portion. A lead wire 1119 extends outward through the through hole 1121A.

FIGS. 7 and 8 are views of the ultrasonic atomization chamber 54 fixing the ultrasonic atomizer 51. The ultrasonic atomization chamber 54 shown in these figures is provided with openings 513A on the bottom surface of the casing 513. The detachable plate 512 is fixed so that the openings 513A are closed in a watertight structure. The detachable plate 512 is fixed, in a watertight structure, to the casing 513 via a packing member 523. Metal fixing members 524 are fixed to the bottom surface of the casing 513 in order to fix the detachable plate 512 thereto. The metal fixing members 524 are shaped in an L-shape. Fastening screws 525, which penetrate through the fixing members 524, press and fix the detachable plate 512 to the casing 513 of the ultrasonic atomization chamber 54. The plurality of ultrasonic oscillators 52, which are fixed to the ultrasonic atomization chamber 54 in this structure, oscillate the solution upward from the bottom surface of the casing 513 to the upper surface at an ultrasonic frequency. The detachable plate 512 is detachably mounted to the bottom surface of the casing 513 of the ultrasonic atomization chamber 54 so as to close the openings 513A.

Figure 12:
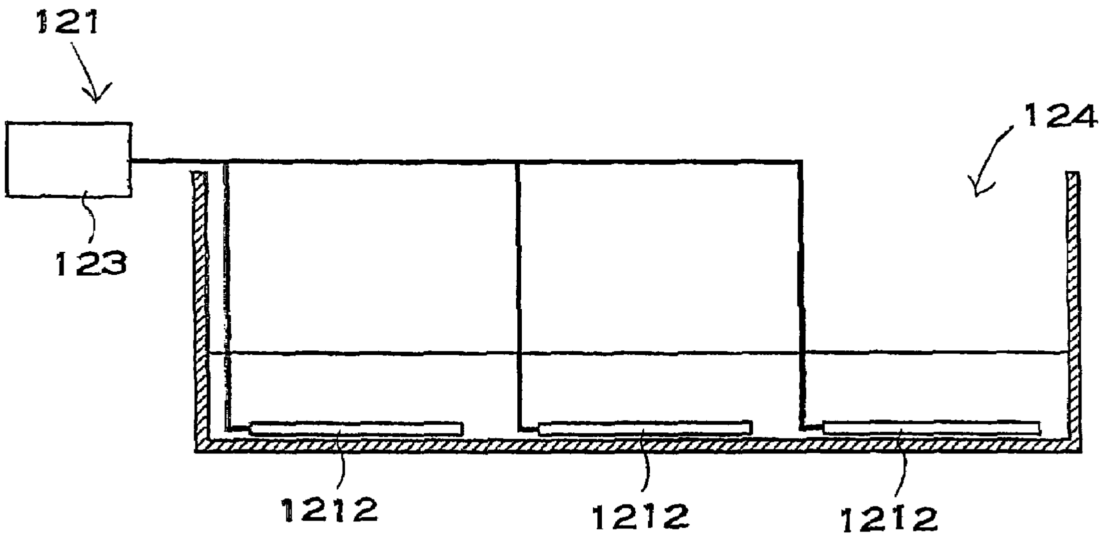
FIG. 12 is a cross-sectional view showing another example of disposing the detachable plate in the ultrasonic atomization chamber.

A detachable plate may be immersed in the solution in an ultrasonic atomization chamber 124 to oscillate the solution at ultrasonic frequency, as shown in FIG. 12. This structure facilitates placement of a detachable plate 1212 to the ultrasonic atomization chamber 124 in a detachable manner. With an ultrasonic atomizer 121 that is immersed in the solution, the ultrasonic oscillator is fixed in a watertight structure to the detachable plate 1212 except the oscillation surface thereof as a structure shown, for example, in FIG. 10. Here, in FIG. 12, the reference numeral 123 represents an ultrasonic power supply.

If the ultrasonic oscillator 2, 202, 302 or the ultrasonic power supply 3, 203, 303 heats the solution in the ultrasonic atomization chamber 4, 204, 304 to a high temperature, the quality may deteriorate. Forced cooling of the ultrasonic oscillator 2, 202, 302 can solve this problem. Furthermore, the ultrasonic power supply 3, 203, 303 is preferably also cooled. The ultrasonic power supply 3, 203, 303 does not directly heat the solution, but heats the surroundings thereof thereby to heat the solution indirectly. The ultrasonic oscillator 2, 202, 302 and the ultrasonic power supply 3, 203, 303 can be cooled by disposing a cooling pipe in a thermally coupled state, namely by disposing a cooling pipe in a state of being in contact. The cooling pipe cools the ultrasonic oscillator and the ultrasonic power supply by running a liquid or refrigerant, which is cooled by a cooler, or cooling water such as ground water or service water.

Furthermore, the concentration apparatus of FIG. 3 further includes a bubble generator 3028 providing bubbles to the solution in the ultrasonic atomization chamber 304. The bubble generator 3028 is provided with a bubble generation portion 3028A in the solution of the ultrasonic atomization chamber 304. This bubble generation portion 3028A provides bubbles into the solution. In this manner, the concentration apparatus providing fine bubbles into the solution of the ultrasonic atomization chamber 304 increases gas solubility in the solution to promote cavitation produced in the solution. Thus, the concentration apparatus has an advantage in that the solution can be atomized into a mist efficiently by means of ultrasonic oscillation.

Furthermore, the concentration apparatus shown in FIG. 3 includes a temperature control mechanism 3075 for controlling the temperature of the solution in the ultrasonic atomization chamber 304. The temperature control mechanism 3075 includes a cooler 3076 for cooling the solution so that the temperature of the solution will be a predetermined temperature. This temperature control mechanism 3075 senses the temperature of the solution stored in the ultrasonic atomization chamber 304 by means of a temperature sensor 3077, and controls the cooler 3076 so as to maintain the temperature of the solution to be not higher than 30° C. Thus, the concentration apparatus, which controls the temperature of the solution by means of the temperature control mechanism 3075, can increase the solubility of bubbles supplied from the bubble generator 3028.

The temperature of the solution affects the efficiency in atomizing the solution into a mist by means of ultrasonic oscillation. When the temperature of the solution lowers, the efficiency in atomizing the solution into a mist decreases. When the temperature of the solution is lowered, the deterioration of the product quality will be smaller. However, if the temperature of the solution is low, the efficiency in atomizing the solution into a mist decreases, so that the temperature of the solution is set at a temperature at which the solution can be efficiently atomized into a mist while considering the property of the target substance that changes with temperature. A target substance that does hardly deteriorate in product quality or does not raise a problem even at a high temperature can be efficiently atomized into a mist by raising the temperature of the solution.

Further, with the concentration apparatus shown in FIGS. 2 and 3, air is blown from a blower mechanism 2027, 3027 to a liquid column P produced at the solution surface W by ultrasonic oscillation in the ultrasonic atomization chamber 204, 304. The blower mechanism 2027, 3027 shown in these figures is provided with a fan 2029, 3029 for blowing air to the liquid column P. Thus, the concentration apparatus that blows air to the liquid column P with the blower mechanism 2027, 3027 has an advantage in that the solution can be efficiently atomized into a mist from the surface of the liquid column P.

However, the concentration apparatus of the present invention need not always be provided with a blower mechanism to blow air to the liquid column, as shown in FIG. 1.

The mist of the solution atomized in the ultrasonic atomization chamber 4, 204, 304 is transported to the collection chamber 5, 205, 305 through the intermediary of a carrier gas. The carrier gas containing the mist is supplied to the collection chamber 5, 205, 305 by the compressor 35, 2035, 3035. The compressor 35, 2035, 3035 is connected between an outlet side of the ultrasonic atomization chamber 4, 204, 304 and an inlet side of the collection chamber 5, 205, 305 so as to supply the carrier gas from the ultrasonic atomization chamber 4, 204, 304 to the collection chamber 5, 205, 305. The compressor 35, 2035, 3035 absorbs and supplies the carrier gas from the ultrasonic atomization chamber 4, 204, 304 to the collection chamber 5, 205, 305 so as to supply the mist in the ultrasonic atomization chamber 4, 204, 304 to the collection chamber 5, 205, 305. The compressor 35, 2035, 3035 supplies the carrier gas to the collection chamber 5, 205, 305 by increasing the pressure of the carrier gas to be higher than an atmospheric pressure. The reason why the compressor 35, 2035, 3035 supplies the carrier gas to the collection chamber 5, 205, 305 by increasing the pressure of the carrier gas to be higher than an atmospheric pressure is to aggregate and collect the mist more effectively by lowering the saturation vapor pressure of the target substance in gas phase in the collection chamber 5, 205, 305 to be lower than the saturation vapor pressure thereof under atmospheric pressure.

The compressor 35, 2035, 3035 to be used may be a compressor of a piston type, a compressor of a rotary type, a compressor of a diaphragm type, a compressor of a Rischorm type, or the like. The compressor 35, 2035, 3035 to be used Is preferably of a type that can transport the carrier gas by pressurizing the carrier gas to 0.2 to 1 MPa.

With the apparatus shown in the drawings, a throttle valve 36, 2036, 3036 is connected to an outlet side of the collection chamber 5, 205, 305 in order to increase the pressure in the collection chamber 5, 205, 305. However, if the flow rate of the carrier gas supplied to the collection chamber by the compressor is high, the throttle valve need not always be provided on the outlet side of the collection chamber. The reason is that, if the passage resistance on the outlet side of the collection chamber is large, the compressor can supply a large amount of the carrier gas to the collection chamber to increase the pressure in the collection chamber to be higher than an atmospheric pressure. However, when the throttle valve 36, 2036, 3036 is connected to the outlet side of the collection chamber 5, 205, 305, the pressure in the collection chamber 5, 205, 305 can be efficiently increased to be higher than an atmospheric pressure. The throttle valve 36, 2036, 3036 increases the pressure in the collection chamber 5, 205, 305 by increasing the passage resistance of the carrier gas discharged from the collection chamber 5, 205, 305 while inhibiting or restricting passage of the mist. The throttle valve 36, 2036, 3036 to be used may be a valve that can adjust the passage resistance of the carrier gas by adjusting the degree of opening, a pipe made of a narrow pipe such as a capillary tube to increase the passage resistance of the carrier gas, or a pipe filled with a resisting material that increases the passage resistance of the carrier gas, or the like. According as the throttle valve 36, 2036, 3036 makes the passage resistance larger, the pressure in the collection chamber 5, 205, 305 will be higher.

Figure 13:
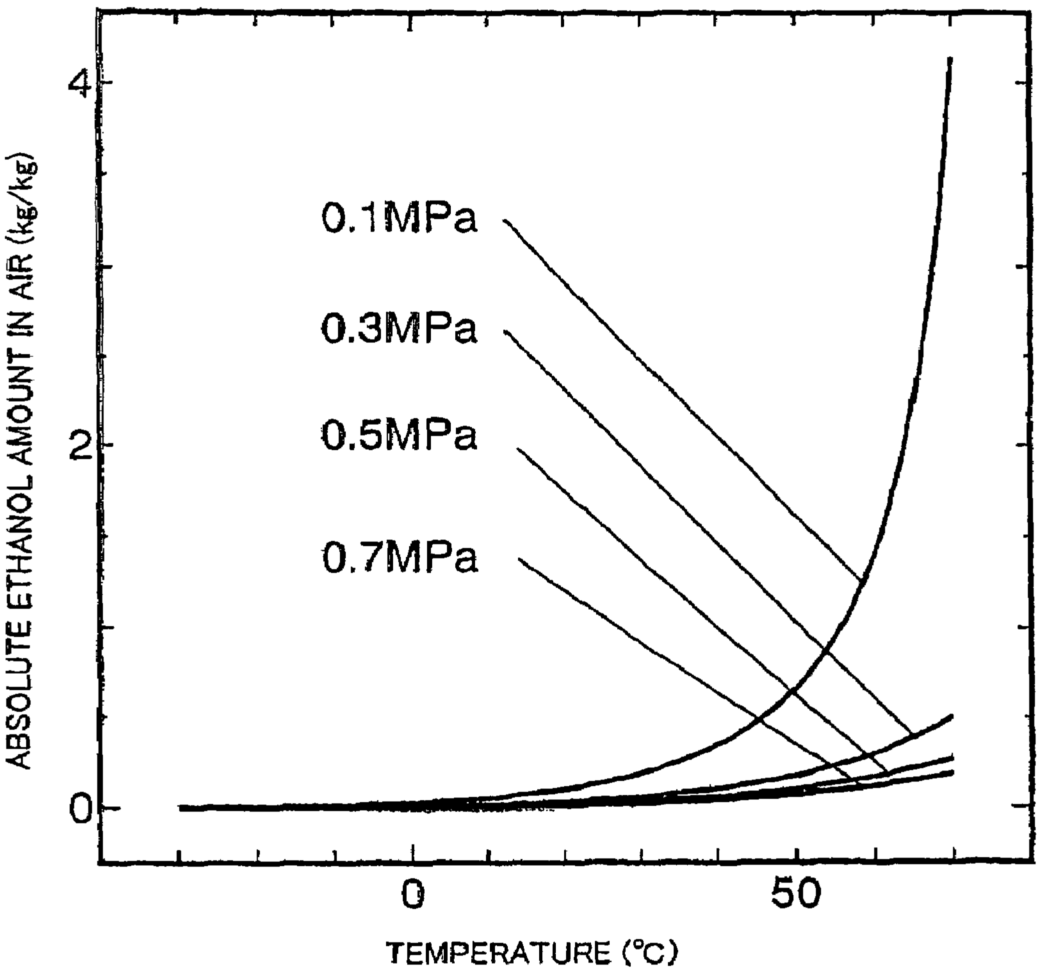
FIG. 13 is a graph showing an absolute ethanol amount in air under pressure.

FIG. 13 shows a state in which the amount of ethanol of the target substance contained in air functioning as a carrier gas decreases according as the pressure in the collection chamber is increased to be higher than an atmospheric pressure. As will be understood from this graph, the air of the carrier gas can contain a larger amount of ethanol in a gas state according as the temperature becomes higher. However, when the pressure becomes higher, the amount of ethanol that can be contained in a gas state rapidly decreases. For example, the amount of ethanol that can be contained in dry air at 30° C. considerably decreases to about ⅕ when the pressure is raised from 0.1 MPa, which is an atmospheric pressure, to 0.5 MPa. When the maximum amount of ethanol that can be contained in a gas state decreases, a larger amount of ethanol than the maximum amount of ethanol will all be in a state of a supersaturated mist, and can be efficiently collected. The ethanol contained in a gas state cannot be aggregated and collected unless turned into a mist. Also, even if ultrasonic oscillation atomizes the target substance into a mist state, the target substance cannot be aggregated and collected in the case that the mist vaporizes into a gas state. For this reason, it is important to collect the target substance, which has been turned into a mist by ultrasonic oscillation, in a mist state without vaporizing the mist. Also, even if the mist vaporizes, the mist can be liquefied again in a supersaturated state and collected. Namely, in order to collect the target substance efficiently, it is important that the target substance once turned into a mist is vaporized into the carrier gas in an amount as little as possible. The present invention increases the pressure of the carrier gas containing the mist to be higher than an atmospheric pressure to reduce the saturation vapor pressure of the target substance, thereby efficiently collecting the target substance contained in the carrier gas not in a gas state but in a mist state. The saturation vapor pressure can be reduced by cooling the carrier gas; however, the pressuring method has a characteristic such that the compressor can lower the saturation vapor pressure efficiently and extremely easily with a low energy consumption. Further, pressurizing while cooling can further reduce the saturation vapor pressure of the target substance, whereby the target substance can be also collected more efficiently.

When the compressor 35, 2035, 3035 compresses the carrier gas, the carrier gas undergoes adiabatic compression to generate heat. Also, when the carrier gas passes through the throttle valve 36, 2036, 3036, the carrier gas undergoes adiabatic expansion to be cooled. The carrier gas supplied from the compressor 35, 2035, 3035 to the collection chamber 5, 205, 305 is preferably cooled so as to collect the mist efficiently. Therefore, when heat is generated, the collection efficiency will be poor. In order to reduce this problem, the apparatus shown in FIG. 1 is provided with a heat-discharging heat exchanger 37 for exchanging heat between a portion on an outlet side of the throttle valve 36 and a portion on an outlet side of the compressor 35 and on an inlet side of the collection chamber 5. With the carrier gas cooled by adiabatic expansion on the outlet side of the throttle valve 36, the heat-discharging heat exchanger 37 cools the carrier gas heated through adiabatic compression by the compressor 35.

Figure 14:
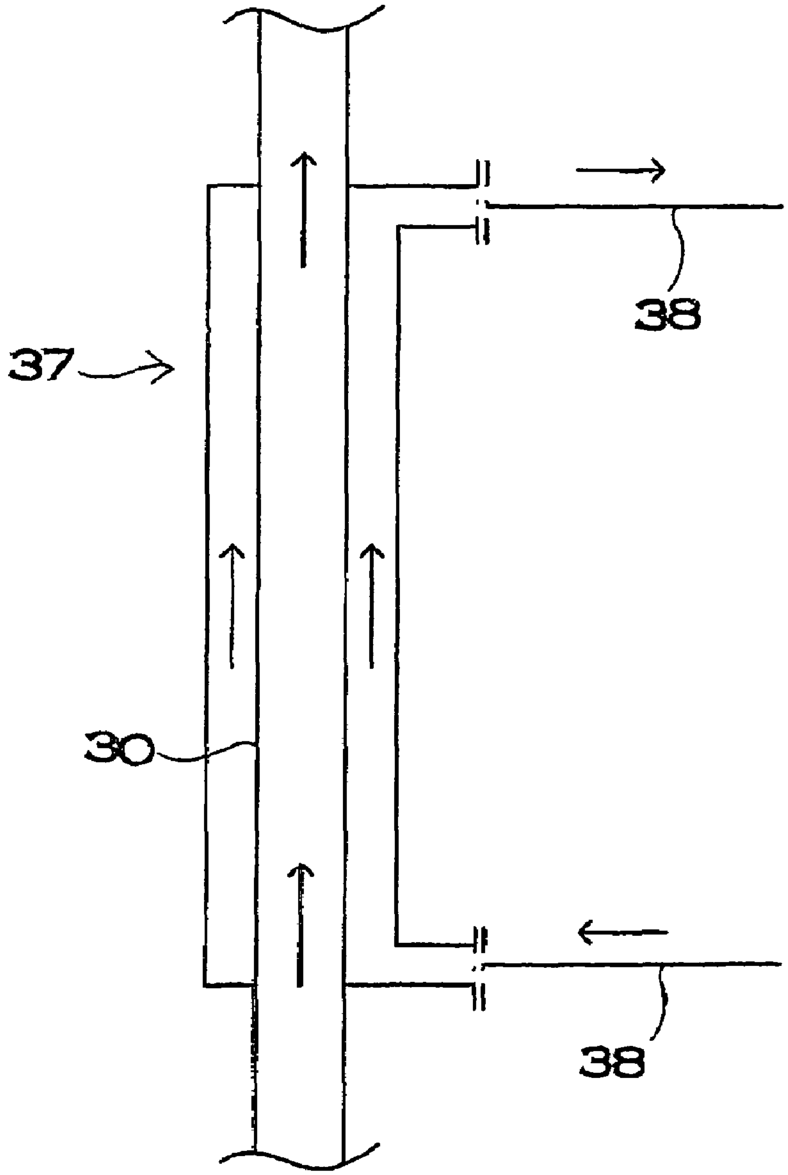
FIG. 14 is an enlarged cross-sectional view showing one example of a structure for thermally coupling a circulation pipe to a circulation duct.

The heat-discharging heat exchanger 37 circulates a refrigerant in the inside of a circulation pipe 38. One end of the circulation pipe 38 is thermally coupled to the outlet side of the throttle valve 36, and the other end of the circulation pipe 38 is thermally coupled to the outlet side of the compressor 35. The refrigerant that circulates in the circulation pipe 38 is cooled on the outlet side of the throttle valve 36. The refrigerant cooled here cools the outlet side of the compressor 35. As illustrated in FIG. 14, the part of the circulation pipe 38 that is thermally coupled has a double-pipe structure so as to achieve thermal coupling between the carrier gas and the refrigerant.

Further, the apparatus shown in FIG. 1 is provided with a second heat-discharging heat exchanger 39 that connects the outlet side of the throttle valve 36 to a heat-radiating heat exchanger 40 that cools the cooling heat exchanger 33. This second heat-discharging heat exchanger 39 has the same structure as the aforesaid heat-discharging heat exchanger 37, and cools the refrigerant on the outlet side of the throttle valve 36. The cooled refrigerant cools the heat-radiating heat exchanger 40 to liquefy the refrigerant that circulates in the inside of the heat-radiating heat exchanger 40. Here, in FIG. 1, the reference numeral 34 represents a heat exchange pipe.

With the apparatus shown in FIGS. 1 to 3, the collection chamber 5, 205, 305 and the ultrasonic atomization chamber 4, 204, 304 are connected with a circulation duct 30, 2030, 3030 so as to circulate the carrier gas through the collection chamber 5, 205, 305 and the ultrasonic atomization chamber 4, 204, 304.

The collection chamber 205, 305 of FIGS. 2 and 3 incorporates a cooling heat exchanger 2033, 3033 for cooling and aggregating the mist. In the cooling heat exchanger 2033, 3033, a fin (not illustrated) is fixed to the heat exchange pipe 2034, 3034. By circulating a refrigerant for cooling or cooling water in the heat exchange pipe 2034, 3034, the cooling heat exchanger 2033, 3033 is cooled. Part of the mist atomized in the ultrasonic atomization chamber 204, 304 is vaporized into gas. The gas is cooled by the cooling heat exchanger 2033, 3033 of the collection chamber 205, 305 and is condensed and aggregated to be collected. The mist that flows into the collection chamber 205, 305 collides with the cooling heat exchanger 2033, 3033, or collides with each other to form a large aggregation, or collides with the fin or the like of the cooling heat exchanger 2033, 3033 to form a large aggregation to be collected as a solution. The air from which the mist and the gas are aggregated and collected by the cooling heat exchanger 2033, 3033 is circulated again to the ultrasonic atomization chamber 204, 304 via the circulation duct 2030, 3030.

Figure 15:
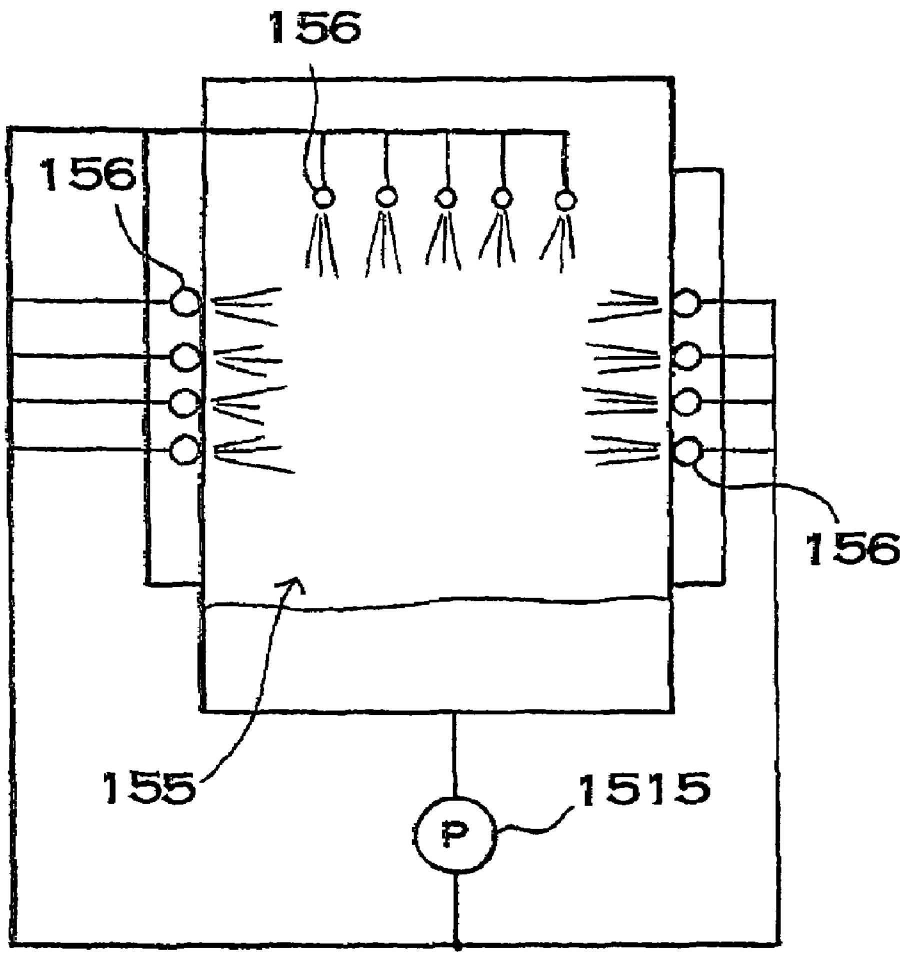
FIG. 15 is a cross-sectional view schematically showing one example of a collection chamber.

In order to collect the mist more speedily in the collection chamber, the collection chamber 155 in FIG. 15 is provided with nozzles 156 that scatter the solution. The nozzles 156 are connected to the bottom portion of the collection chamber 155 via a circulation pump 1515. The circulation pump 1515 sucks the solution collected in the collection chamber 155 and sprays the sucked solution through the nozzles 156.

With the concentration apparatus shown in FIG. 15, the nozzles 156 are disposed in the upper part of the collection chamber 155. The nozzles 156 in the upper part spray the solution downwards. The solution sprayed through the nozzles 156 are made of water droplets that are sufficiently larger than the droplets of the mist atomized by the ultrasonic atomizer, and fall down speedily in the inside of the collection chamber 155. When falling down, the water droplets collide with the mist that is floating in the inside of the collection chamber 155, and fall down while collecting the mist. Therefore, the mist floating in the collection chamber 155 can be collected speedily and efficiently.

With the concentration apparatus shown in FIG. 15, the nozzles 156 are disposed in the upper part; however, the nozzles can be disposed in the lower part of the collection chamber. The nozzles in the lower part spray the solution upwards. These nozzles spray the solution at a speed that makes the solution collide with the ceiling of the collection chamber or at a speed that lifts the solution up to a neighborhood of the ceiling. The solution that is sprayed to be lifted up to the neighborhood of the ceiling changes its direction downwards at the neighborhood of the ceiling and falls. Therefore, the sprayed solution gets in contact with the mist when rising and falling, thereby efficiently collecting the mist.

Figure 16:
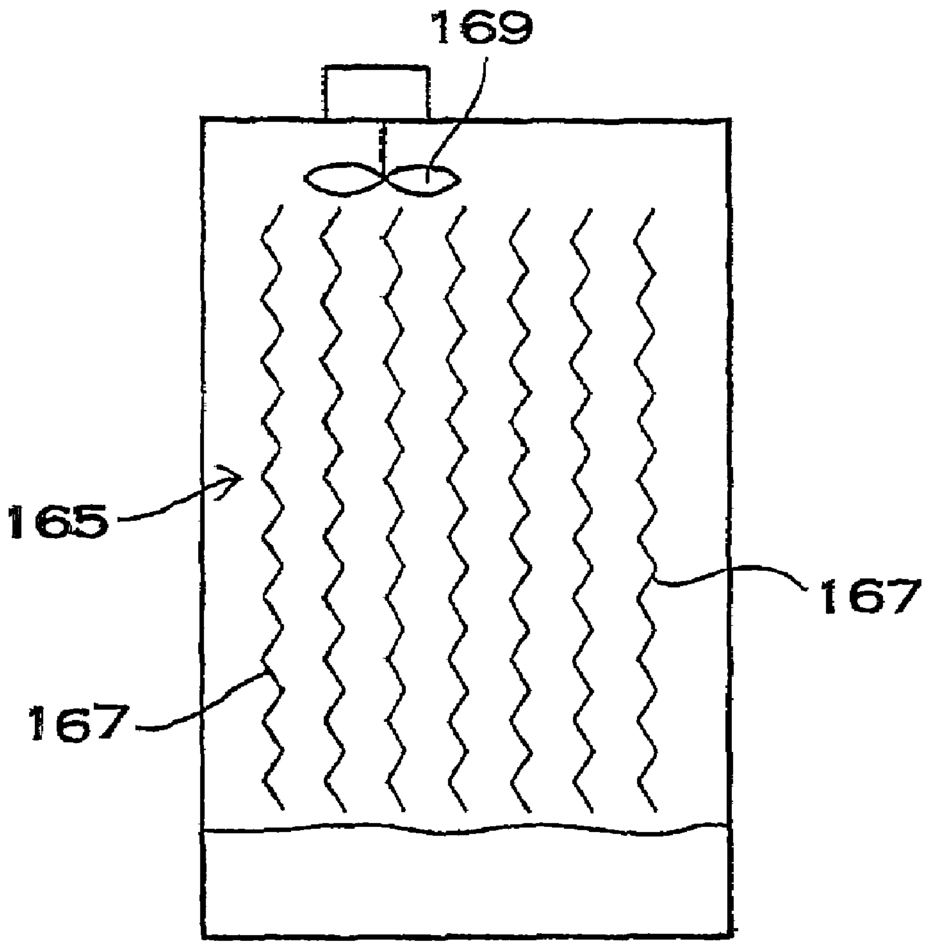
FIG. 16 is a cross-sectional view schematically showing another example of a collection chamber.

Plural sheets of baffle plates 167 (not shown) are provided in the collection chamber 165 of FIG. 16. Each baffle plate 167 is spaced apart from adjacent baffle plates 167 with a gap through which the mist can pass, and is disposed in a vertical posture. The mist collides with the surface of the baffle plates 167 to produce a solution, and the vertical baffle plates 167 can let the adhering solution flow down in a natural manner to be collected. The baffle plates 167 in FIG. 16 have an uneven surface, whereby the mist comes into contact more efficiently with the surface to be collected.

Furthermore, a fan 169, which blows and stirs the mist in a forced manner, is provided in the collection chamber 165 of FIG. 16. The fan 169 stirs the mist in the collection chamber 165. The droplets of the stirred mist collide with each other and aggregate, or collide with the surface of the baffle plates 167 and aggregate. The aggregated mist quickly falls down and is collected. The fan 169 in FIG. 16 blows the mist of the collection chamber 165 downwards for circulation.

Figure 17:
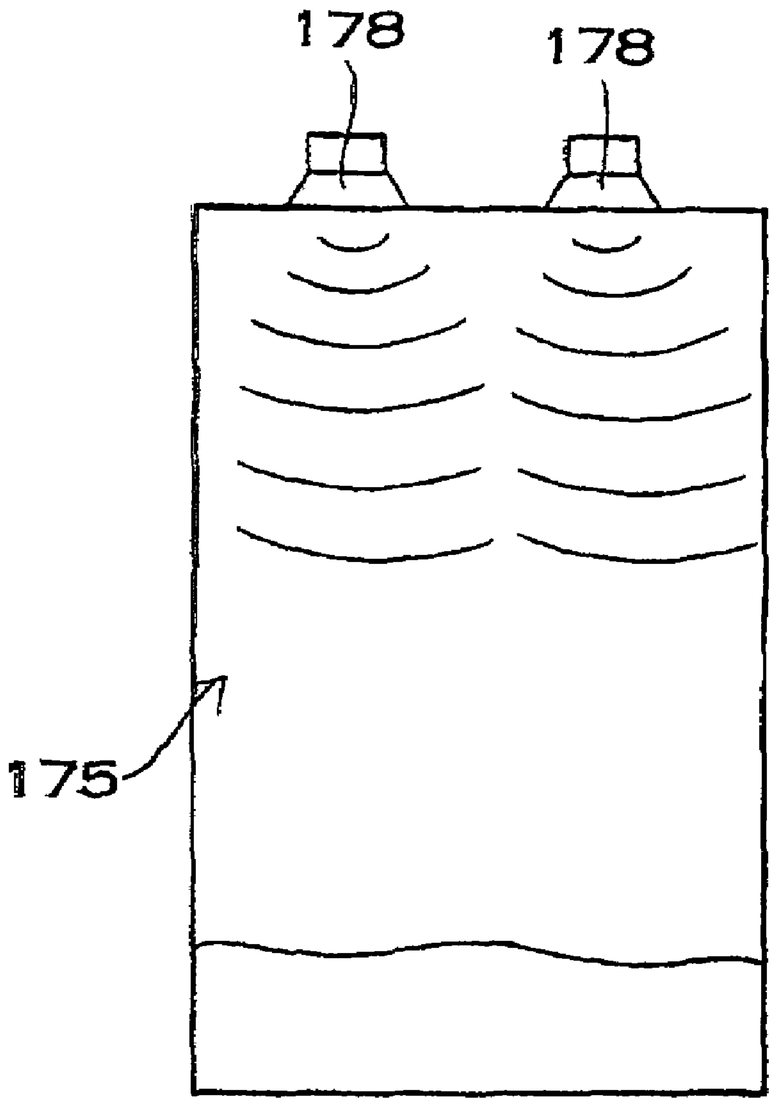
FIG. 17 is a cross-sectional view schematically showing one example of a collection chamber.

Furthermore, a mist oscillator 178 for oscillating the mist to increase the probability of collision with each other is provided in the collection chamber 175 of FIG. 17. The mist oscillator 178 includes an electrical-to-mechanical oscillation converter, which oscillates the gas of the collection chamber 175, and an oscillation power supply that drives the electrical-to-mechanical oscillation converter. The electrical-to-mechanical oscillation converter is a speaker for emitting a sound at an audible frequency, an ultrasonic oscillator for emitting ultrasonic waves having a frequency higher than an audible frequency, or the like. In order that the electrical-to-mechanical oscillation converter may efficiently oscillate the mist, the oscillation emitted from the electrical-to-mechanical oscillation converter is resonated in the collection chamber 175. In order to achieve this resonation, the electrical-to-mechanical oscillation converter oscillates the mist at the frequency that resonates in the collection chamber 175. In other words, the collection chamber 175 is designed to have a shape that is resonated with the oscillation emitted from the electrical-to-mechanical oscillation converter.

Ultrasonic waves involve high frequencies above the audible frequency of human beings and are inaudible with ears. For this reason, with the mist oscillator 178 emitting ultrasonic waves, even if the gas in the collection chamber 175 is intensely oscillated, in other words, even if the output power of the electrical-to-mechanical oscillation converter is very high, the mist oscillator does not give harms to human beings with sound. Therefore, ultrasonic waves have an advantage in that the mist can be intensely oscillated, and the droplets of the mist are made to collide with each other efficiently to be quickly collected.

With the concentration apparatus described above, a device that aggregates the mist efficiently is disposed in the collection chamber, so that the mist can be aggregated more speedily to prepare a solution having a high concentration. Further, though not illustrated, the concentration apparatus of the present invention may incorporate in the collection chamber all of the nozzles that spray the solution, the fan that stirs the mist, and the oscillator that oscillates the mist to aggregate the mist most efficiently. Also, two devices that aggregate the mist may be incorporated to aggregate the mist efficiently.

The ultrasonic atomization chamber 4, 204, 304 and the collection chamber 5, 205, 305 are preferably filled with an inert gas. With this apparatus, the inert gas prevents deterioration of the quality of the solution in the ultrasonic atomization chamber 4, 204, 304 and the collection chamber 5, 205, 305. For this reason, a solution having a high concentration can be obtained in a state having a higher product quality.

Furthermore, with the concentration apparatus of the present invention, though not illustrated, the mist can be collected by connecting any one of a cyclone, a punched plate, a demistor, a chevron, a scrubber, a spray tower, and an electrostatic collector to the ultrasonic atomization chamber. These mechanisms may be disposed, for example, between the ultrasonic atomization chamber and the compressor or between the compressor and the collection chamber and, together with the collection chamber, can efficiently collect the mist.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims. This application is based on applications No.2004-090694 filed in Japan on Mar. 25, 2004, the content of which is incorporated hereinto by reference.

What is claimed is:

1. An apparatus for concentrating a solution, comprising:

an ultrasonic atomization chamber for receiving a solution containing a target substance;

an ultrasonic oscillator for atomizing the solution into a mist by ultrasonic oscillation in an inside of the ultrasonic atomization chamber;

an ultrasonic power supply connected to the ultrasonic oscillator for supplying high-frequency electric power to the ultrasonic oscillator to generate ultrasonic oscillation;

a collection chamber for aggregating and collecting the mist atomized by the ultrasonic oscillator, wherein the mist atomized in the ultrasonic atomization chamber is collected in the collection chamber to separate the target substance from the solution; and a compressor connected between an outlet side of the ultrasonic atomization chamber and an inlet side of the collection chamber to absorb and supply the mist in the ultrasonic atomization chamber to the collection chamber, said compressor being operable to increase a pressure in the collection chamber so as to be higher than an atmospheric pressure so that a saturation vapor pressure of the target substance in a gas phase in the collection chamber is made lower than a saturation vapor pressure thereof under atmospheric pressure, so as to aggregate and collect the mist, wherein the collection chamber is provided with a cooling heat exchanger to cool, aggregate and collect the mist.

2. The apparatus for concentrating a solution according to claim 1, wherein any one of a cyclone, a punched plate, a demistor, a chevron, a scrubber, a spray tower, and an electrostatic collector to the ultrasonic atomization chamber is connected to the ultrasonic atomization chamber to collect the mist.

3. An apparatus for concentrating a solution, comprising:

an ultrasonic atomization chamber for receiving a solution containing a target substance;

an ultrasonic oscillator for atomizing the solution into a mist by ultrasonic oscillation in an inside of the ultrasonic atomization chamber;

an ultrasonic power supply connected to the ultrasonic oscillator for supplying high-frequency electric power to the ultrasonic oscillator to generate ultrasonic oscillation;

a collection chamber for aggregating and collecting the mist atomized by the ultrasonic oscillator, wherein the mist atomized in the ultrasonic atomization chamber is collected in the collection chamber to separate the target substance from the solution; and a compressor connected between an outlet side of the ultrasonic atomization chamber and an inlet side of the collection chamber to absorb and supply the mist in the ultrasonic atomization chamber to the collection chamber.

said compressor being operable to increase a pressure in the collection chamber so as to be higher than an atmospheric pressure so that a saturation vapor pressure of the target substance in a gas phase in the collection chamber is made lower than a saturation vapor pressure thereof under atmospheric pressure, so as to aggregate and collect the mist, wherein a throttle valve is connected to an outlet side of the collection chamber, and a heat-discharging heat exchanger is provided for exchanging heat between a portion on an outlet side of the throttle valve and a portion on an outlet side of the compressor which is also an inlet side of the collection chamber.

4. The apparatus for concentrating a solution according to claim 3, wherein the collection chamber is provided with a cooling heat exchanger.

5. The apparatus for concentrating a solution according to claim 4, further comprising a heat-radiating heat exchanger for cooling and liquefying a refrigerant, the heat-radiating heat exchanger being connected to a refrigerant circulation path of the cooling heat exchanger, wherein the heat-radiating heat exchanger is thermally coupled to the heat-discharging heat exchanger connected to an outlet side of the throttle valve so that the heat-radiating heat exchanger is cooled by the heat-discharging heat exchanger.

* * * * *